TRIALKOXY VANADATE CURING AGENTS FOR SILANOL-CONTAINING POLYSILOXANES

Harry F. Lamoreaux, Schenectady, N.Y., assignor to General Electric Company, a corporation of New York
No Drawing. Filed Dec. 3, 1965, Ser. No. 511,336
5 Claims. (Cl. 260—46.5)

This invention relates to the curing of organopolysiloxanes containing silicon-bonded hydroxyl groups (silanol groups).

In a number of prior art applications, many types of curing agents have been used to cure silanol-containing organopolysiloxanes. These curing agents have included salts of organic carboxylic acids, such as tin octoate, dibutyl tin dilaurate, as well as organometallic materials, such as alkyl orthotitanates, and alkyl orthozirconates. While many of these prior art materials are satisfactory in some applications, there have been some disadvantages associated with these materials. For example, the resulting cured products have not had as high a degree of hydrolytic stability as desired, and in some cases, the curing agents have imparted an objectionable odor to the product.

An object of my invention is to provide an improved curing agent for silanol-containing organopolysiloxanes. A further object of this invention is to provide an improved catalyzed siloxane-containing organopolysiloxane composition.

These, and other objects of my invention, are best understood by reference to the following detailed description and from the appended claims.

This invention relates to the use of trialkoxy vanadates having the formula:

(1) $\qquad (RO)_3VO$ where R is a lower alkyl radical, e.g., an alkyl radical containing from 1 to 7 carbon atoms, as a curing agent for an organopolysiloxane containing silicon-bonded hydroxyl groups and having the formula:

(2) $\qquad (HO)_a(R')_bSiO_{4-a-b/2}$ where $a$ has a value of from about 0.002 to 0.4, $b$ has a value of from 1.00 to 2.00, and the sum of $a$ plus $b$ is from about 1.002 to 2.04, and where R' is a member selected from the class consisting of monovalent hydrocarbon radicals, halogenated monovalent hydrocarbons and cyanoalkyl radicals. The class of organopolysiloxanes within the scope of Formula 2 can also be described as organopolysiloxanes containing an average of from about 0.01 to 10% by weight of silicon-bonded hydroxyl groups and having the valences of silicon other than the valences in the siloxane chain being satisfied by from 0.002 to 0.4 hydroxyl groups per silicon atom and with from 1.00 to 2.00 silicon-bonded R groups per molecule, and with there being a total of from 1.002 to 2.04 R groups and silanol groups per silicon atom.

Among the radicals represented by R' in Formula 2 can be mentioned, for example, alkyl radicals, e.g., methyl, ethyl, propyl, butyl, octyl, cyclohexyl, cycloheptyl, etc. radicals; aryl radicals, e.g., phenyl, tolyl, xylyl, naphthyl, etc. radicals; aralkyl radicals, e.g., benzyl, phenylethyl, etc. radicals; aliphatically unsaturated radicals, e.g., vinyl, allyl, cyclohexenyl, etc. radicals; halogenated monovalent hydrocarbon radicals, e.g., chloromethyl, chloroethyl, dibromophenyl, trifluoromethylethyl radicals, etc.; cyanoalkyl radicals, e.g., cyanoethyl, beta-cyanopropyl, gamma-cyanopropyl, etc. radicals. In the preferred embodiment of my invention, the radicals represented by R' are methyl or a mixture of methyl and phenyl.

The trialkoxy vanadates within the scope of the present invention are well known in the art and include compounds such as trimethoxy vanadate, tri-n-butoxy vanadate, triheptoxy vanadate, etc. Alternative nomenclature for these compounds is in terms of vanadium oxides so that these compounds are sometimes called tributyl vanadium oxide, trimethyl vanadium oxide, etc. These compounds are generally solid materials which can be used as such or can be used as solutions or suspensions in various organic solvents, such as benzene, mineral spirits and the like.

The organopolysiloxanes within the scope of Formula 2 are well known in the art and vary from resinous organopolysiloxanes to linear silanol chain-stopped diorganopolysiloxanes. These organopolysiloxanes are generally composed of one or more various types of organopolysiloxane units, including $R'_3SiO_{0.5}$ units, $R'_2SiO$ units, $R'SiO_{1.5}$ units, as well as $SiO_2$ units. These materials, as previously mentioned, include silanol chain-stopped linear diorganosiloxane fluids having the formula:

(3) $\qquad HO(R'_2SiO)_nH$ where R' is as previously defined and $n$ has a value of from 2 to 1,000 or more. The preferred silanol-containing organopolysiloxanes within the scope of the present invention are those silanol chain-stopped diorganopolysiloxanes within the scope of Formula 3 in which R' is methyl and in which $n$ has a value of from about 100 to 1,000. Other types of organopolysiloxanes within the scope of the present invention include mixtures of various polysiloxanes within the scope of Formula 3, various organopolysiloxane resins containing combinations of various $R'SiO_{1.5}$ units and $R'_2SiO$ units, as well as mixtures of resinous organopolysiloxanes composed of $R'_3SiO$ units and $SiO_2$ units alone or in combination with $R'_2SiO$ units. In addition to the curing of copolymers, the process of the present invention is also directed to the curing of various blends of silanol-containing organopolysiloxanes.

The organopolysiloxanes are cured according to the process of the present invention by simply mixing the trialkoxy vanadate of Formula 1 with the organopolysiloxane containing silicon-bonded hydroxyl groups in an amount such as to provide from about 0.01 to 0.5% by weight of the vanadate based on the weight of the siloxane. While satisfactory curing of the siloxane can be obtained with amounts of the vanadate greater than about 0.5% by weight, the use of increased quantities of the vanadate results in a product which assumes the greenish-yellow color of the vanadate as the concentration of the vanadate is increased.

Where the organopolysiloxane is a liquid material, the vanadate, either in solid form or as a solution, e.g., a 25 to 75% by weight solution of the vanadate in a solvent such as mineral spirits, is merely mixed with the liquid organopolysiloxane. Where the organopolysiloxane is a solid material, it is preferable to form an organic solvent solution of the organopolysiloxane and then add the vanadate, either as a solid or a solution, to the organopolysiloxane solution. Suitable solvents for the organopolysiloxane include hydrocarbons and halogenated hydrocarbons, such as benzene, toluene, hexane, butanol, methyl isopropyl ketone, perchloroethylene and the like. The only requirement of the solvent is that it be an effective solvent for the organopolysiloxane and not react with the organopolysiloxane. The amount of solvent employed is not critical with the amount generally being the minimum amount necessary to form a complete solution of the organopolysiloxane. Generally this can be from about 10 to 90% solvent, depending upon the particular solvent and the particular organopolysiloxane under consideration.

In order to cure the catalyzed compositions prepared by adding the vanadate of Formula 1 to the siloxane of Formula 2, it is necessary to heat the reaction mixture slightly above room temperature to insure a rapid rate of reaction. In general, satisfactory cure rates are obtained when reaction mixtures are heated at a temperature of at least about 40° C. In those cases in which either vanadate or the organopolysiloxane is employed as a solution, it is desirable to heat the catalyzed reaction mixture to a temperature sufficiently high to remove the solvent, since solvent removal is an integral part of the total curing operation. Generally speaking, regardless of the solvent employed, satisfactory solvent removal and curing is effected at temperatures which need be no greater than about 120° C.

The catalyzed compositions of the present invention are particularly useful in the formation of various articles coated with organopolysiloxanes. Thus, the catalyzed linear silanol chain-stopped organopolysiloxane compositions of the present invention are useful in coating paper and textile fabrics to render these materials water-repellent. The use of the vanadates of the present invention has certain advantages over orthotitanates which have sometimes been used in these reactions, in that the vanadates result in a uniform cure of the composition and produce a product having improved resistance to reversion.

The catalyzed compositions of the present invention can be used in conventional fashion. Thus, a coated fabric can be prepared by applying a composition comprising tributoxy vanadate dissolved in a silanol chain-stopped dimethylpolysiloxane to a cotton surface by knife coating the composition onto cotton cloth in an amount sufficient to provide a 2 to 3% pickup based on the weight of the fabric. The cloth is then heated at a temperature of 80° C. for 30 minutes to cure the organopolysiloxane to an elastic, rubbery layer which renders the textile water-repellent and makes it useful as a tarpaulin for outdoor applications. Compositions comprising methyl silicone resins are prepared for use in the manufacture of silicone glass laminates by adding the trialkoxy vanadate to a silicone resin solution, dipping glass cloth into the resin and then superimposing a number of layers of the thus treated glass cloth and placing the entire assembly into a laminating press heated to a temperature of about 110° C., at which temperature the silicone resin cures to form a silicone resin glass laminate.

In order that those skilled in the art may better understand the present invention, the following examples are presented for purposes of illustration and not for limitation.

*Example 1*

A catalyzed organopolysiloxane solution was prepared by adding 0.5 part of a 50% by weight solution of tributoxy vanadate in mineral spirits to 100 parts of a silanol chain-stopped dimethylpolysiloxane having a viscosity of about 2,500 centistokes at 25° C. and a molecular weight of 38,000. This material contained an average of .09% by weight silicon-bonded hydroxyl groups and fell within the scope of Formula 2, where R' is methyl, $a$ is 2.00, $b$ has a value of 0.004, and the sum of $a$ plus $b$ has a value of 2.004. This material was cast into a tray to a thickness of 0.5 mm. and then heated at a temperature of 120° C. for 30 minutes, during which time the composition cured to a tough, rubbery film which was substantially colorless.

*Example 2*

A composition identical to that of Example 1 was prepared except that it was doctored onto the surface of cotton duck cloth to provide .009 g. of the composition per square inch of cloth. This composition was heated at a temperature of 120° C. for 5 minutes to provide a material containing a cured, flexible silicone layer which was tough and water-repellent.

*Example 3*

A catalyzed resinous composition was prepared by adding 0.5 part of a 25% solution of trimethoxy vanadate in toluene to 100 parts of a 50% toluene solution of a methylphenylpolysiloxane resin containing 2% by weight silicon-bonded hydroxyl groups and an average of 0.8 methyl groups and 0.4 phenyl groups per silicon atom. Following the procedure earlier described, a glass cloth was dipped into this composition and excess solution was allowed to drain off. The glass cloth was partially cured at 150° C. for 10 minutes. This was then superimposed to provide a stack of layers of glass cloth ⅛ inch thick which was placed in a press and heated at a temperature of 175° C. for 30 minutes, resulting in a stiff, cured silicone resin-impregnated silicone-glass laminate having utility as a circuit board in electronic applications.

While the foregoing specific examples have illustrated many of the embodiments of my invention, it should be understood that my invention is broadly concerned with catalyzed compositions containing the trialkoxy vanadate of Formula 1 in conjunction with the silanol-containing organopolysiloxane of Formula 2 in the amounts previously described. These compositions are converted to the cured state by the application of heat.

What I claim as new and desire to secure by Letters Patent of the United States is:

1. A curable composition comprising a trialkoxy vanadate having the formula:

$$(RO)_3VO$$

where R is a lower alkyl radical and a silanol-containing organopolysiloxane having the formula:

$$(HO)_a(R'-)_bSiO_{4-a-b/2}$$

where R' is a member selected from the class consisting of monovalent hydrocarbon radicals, halogenated monovalent hydrocarbon radicals and cyanoalkyl radicals, $a$ has a value of from 0.002 to 0.4, $b$ has a value of from 1.00 to 2.00 and the sum of $a$ plus $b$ is from 1.002 to 2.04.

2. The composition of claim 1 in which the trialkoxy vanadate is tributoxy vanadate.

3. The composition of claim 1 in which the organopolysiloxane is a silanol chain-stopped dimethylpolysiloxane.

4. The composition of claim 1 in which the vanadate is tributoxy vanadate and in which the organopolysiloxane is a silanol chain-stopped dimethylpolysiloxane.

5. The composition of claim 1 in which the vanadate is present in an amount sufficient to provide from about 0.01 to 0.5 percent by weight of the vanadate based on the weight of the organopolysiloxane.

References Cited

UNITED STATES PATENTS

| Re. 23,879 | 9/1954 | Currie | 260—46.5 |
| 2,678,893 | 5/1954 | Kauppi | 260—46.5 |
| 2,736,721 | 2/1956 | Dexter | 260—46.5 |
| 2,774,690 | 12/1956 | Cockett et al. | 117—135.5 |
| 2,863,891 | 12/1958 | Granchelli et al. | 260—42.9 |

OTHER REFERENCES

Arlov et al., Doklady Akad. Nauk SSSR, vol. 122, pages 246 to 249, September-October 1958.

Noll, Chemie und Technologie der Siliconel, Verlag Chemie, G.m.b.H., Weinheim, Bergstrasse, 1960, pages 146 to 148.

DONALD E. CZAJA, *Primary Examiner.*

LEON J. BERCOVITZ, *Examiner.*

M. I. MARQUIS, *Assistant Examiner.*